United States Patent [19]

Graves

[11] Patent Number: 5,190,164

[45] Date of Patent: Mar. 2, 1993

[54] BEAD SORTING TOOL

[76] Inventor: Allen Graves, 5333 SE. Henderson, Portland, Oreg. 97206-8228

[21] Appl. No.: 802,132

[22] Filed: Dec. 3, 1991

[51] Int. Cl.$^5$ .................... B07B 13/05; B07C 7/04
[52] U.S. Cl. .................... 209/614; 209/659; 294/1.1
[58] Field of Search ........... 209/606, 659, 936, 700, 209/702, 703, 614; 70/63; 109/45, 54; 229/8; 294/1.1

[56] References Cited

U.S. PATENT DOCUMENTS

| | | | |
|---|---|---|---|
| 896,945 | 8/1908 | Smith | 229/8 |
| 1,141,727 | 6/1915 | Seaman . | |
| 2,600,068 | 6/1952 | Meyers | 294/1 |
| 2,610,882 | 9/1952 | Sutcliffe | 294/1 |
| 3,201,815 | 8/1965 | Selby | 15/104 |
| 3,211,290 | 10/1965 | Strickling | 209/614 X |
| 3,658,618 | 4/1972 | Gramann | 156/235 |
| 4,073,530 | 2/1978 | Seidler | 294/19 |
| 4,818,383 | 4/1989 | Wang | 209/702 |
| 4,836,592 | 6/1989 | Roberts | 294/1.1 |
| 4,848,815 | 7/1989 | Molloy | 294/1.1 |
| 4,957,217 | 9/1990 | Ritson | 221/210 |

Primary Examiner—Donald T. Hajec

[57] ABSTRACT

A sorting tool comprising a flat thickness of rigid material (14) on which lie a multiplicity of removable, individually labeled, equal-sized and uniformly stacked sheets of material of known thickness (16). A chamber (18) formed in the sheets by the removal of a large area of material in their center contains the objects to be sorted. A pallet (22) with a flat adhesive (26) surface is used to select and remove the objects. The individual thickness of the sheets determines the size range and their collective thickness determines the minimum size of the selected objects. Appropriate holders for round or irregularly shaped objects may be inserted in the chamber.

6 Claims, 3 Drawing Sheets

Perspective View of Sorter With Frame

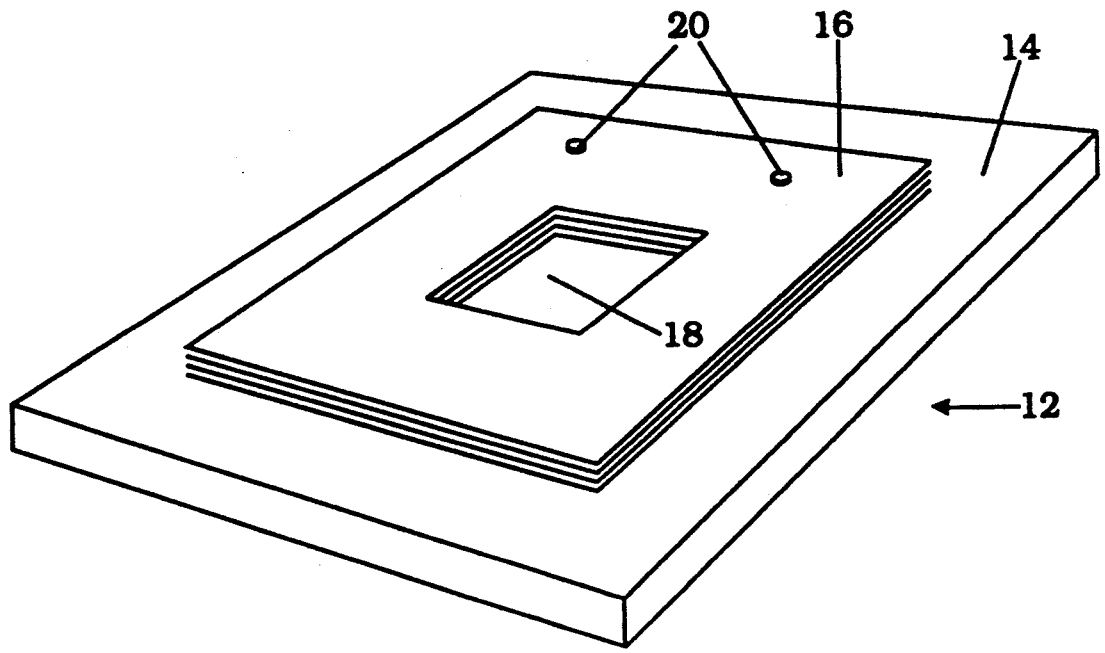
Fig 1-Perspective View Of Sorter
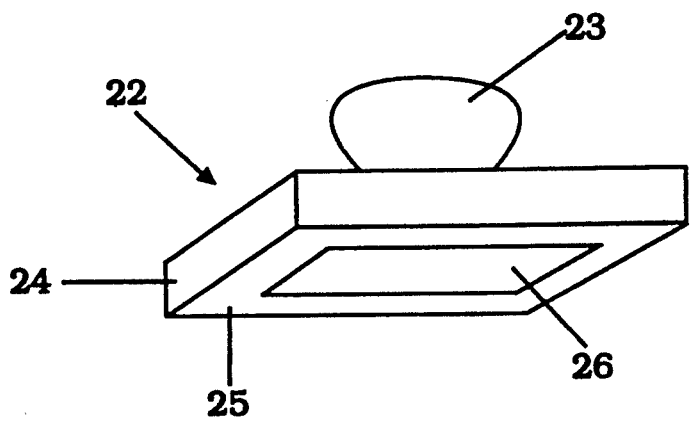
Fig 2 - Perspective View Of Pallet
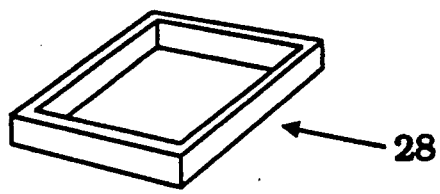
Fig 3 - Perspective View Of Bead Placement Guide

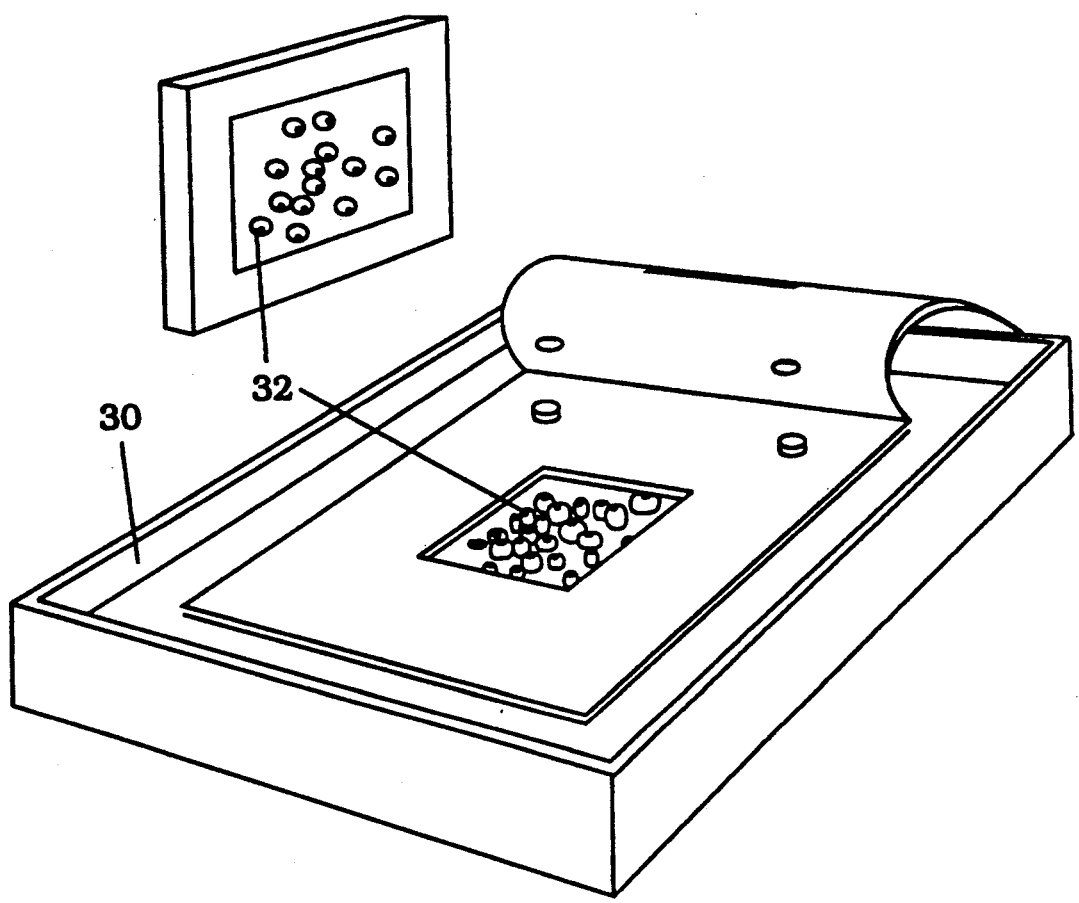
Fig 4 - Perspective View of Sorter With Frame
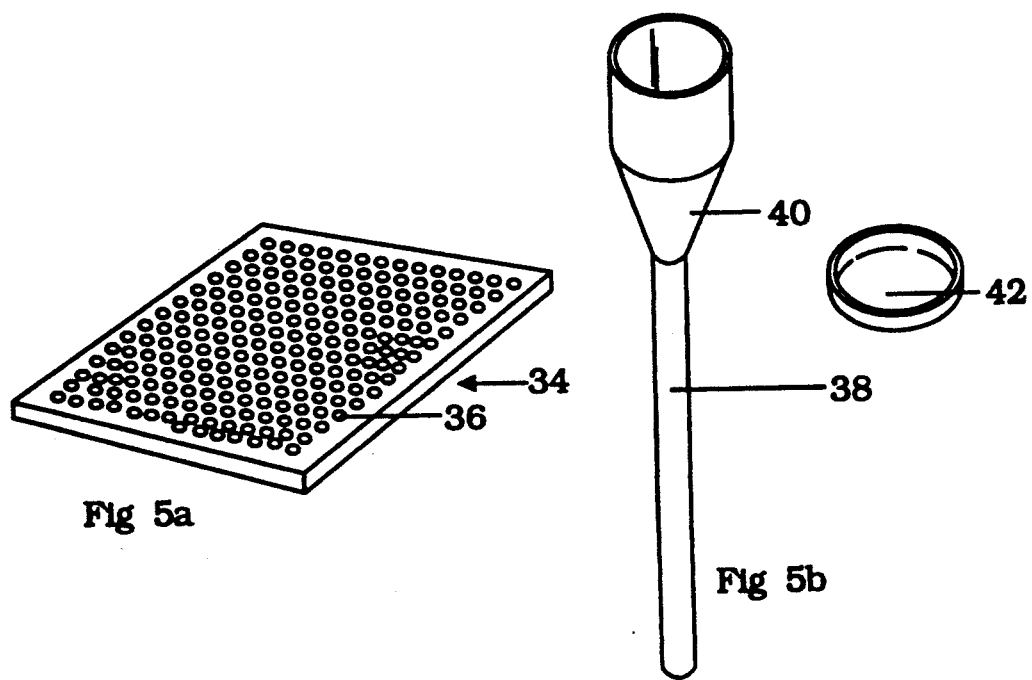
Fig 5a
Fig 5b
Fig 5 - Tubular Bead Accessories

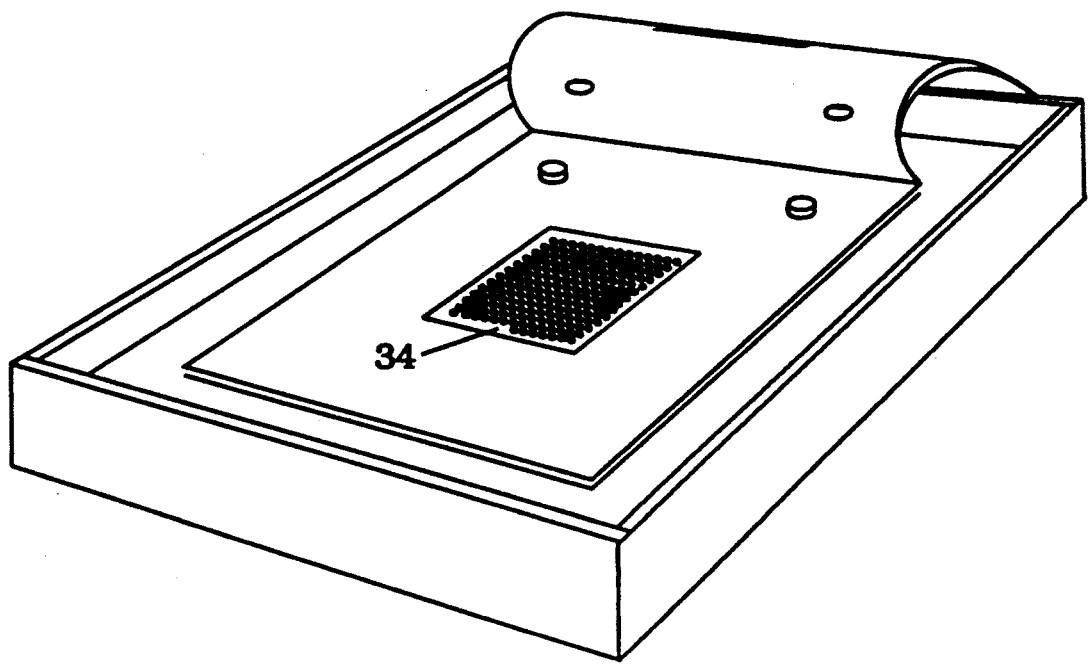
Fig 6 - Sorter With Tubular Bead Holder
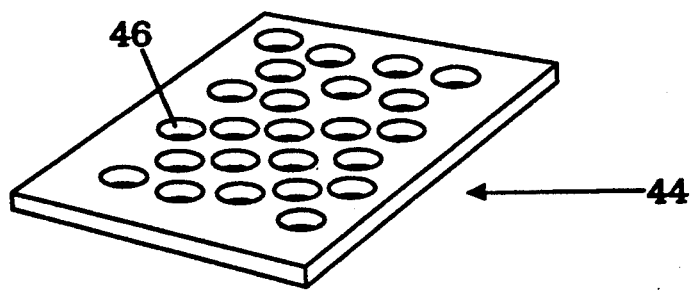
Fig 7 - Round Object Holder

BEAD SORTING TOOL

BACKGROUND

1. Field of Invention

This invention relates to sorting tools, specifically to a tool for sorting beads which are sued for making craft and apparel items.

2. Description of Prior Art

Beads, used to make craft, apparel and jewelry items such as belts, fringes and earrings, are sold in a variety of shapes and sizes. Seed beads, cylindrical in construction, are thin slices of glass tubing of approximately 2 mm diameter. During the manufacturing process the edges of the beads become rounded. Due to the nature of the process, seed beads commonly vary in size from wafers of less than 1 mm thickness to cylinders of 3 mm or more in length within the same lot. They are oblate in shape and lie naturally on a pole when placed on a flat surface. Tubular beads are cylinders of approximately 2 mm diameter and 3.5 mm or more length and also vary in length as much as 2 mm within any size lot. Until now, bead-crafters wanting to make symmetrical items, or two or more items of the same size, have selected equal-sized beads by repeated comparison of one bead with others until a sufficient number of beads was obtained. Since a simple beaded craft item can require the use of five hundred or more beads, this method of bead selection clearly has been inefficient for bead-crafters working with large numbers of beads. The lack of a means for sorting beads accurately, consistently and in bulk quantities has been responsible, in part, for keeping beaded jewelry and apparel items out of the mainstream of fashion and has made beads one of the least popular of the many craft media.

OBJECTS AND ADVANTAGES

Accordingly, several objects and advantages of this invention are:

(a) to provide a tool for sorting in quantity;
(b) to provide a tool for sorting which uses a consistent sizing convention;
(c) to provide a tool for sorting diverse shapes and sizes;
(d) to provide a tool which is accurate and easy to use

DRAWING FIGURES

FIG. 1 is a perspective view of the sorter.

FIG. 2 is a perspective view of the pallet.

FIG. 3 is a perspective view of the bead placement guide.

FIG. 4 is a perspective view of the sorter, showing several of the sizing sheets folded back and the selection of a particular size of seed beads.

FIGS. 5, 5a, and 5b are a perspective view of devices required to sort tubular beads.

FIG. 6 is a perspective view of the sorter with a tubular bead holder inserted in the chamber.

FIG. 7 is a perspective view of a holder for round beads.

Reference Numerals In Drawings

12: sorter
16: sizing sheets
20: dowels
23: handle
25: bottom face of pallet base
28: placement guide
32: seed beads
36: bores
40: funnel
44: round bead holder
14: base of sorter
18: placement chamber
22: pallet
24: base of pallet
26: adhesive
30: frame
34: tubular bead holder
38: tube
42: lid
46: cavities.

DESCRIPTION

FIGS. 1 to 7

FIG. 1 illustrates the sorter 12. Its base 14 consists of a thickness of material with a flat surface. On the base are stacked a multiplicity of removable, individually labeled, equal-sized and uniformly stacked sheets of plastic, paper or other material 16, whose individual thickness is uniform and known. Each sheet has a large area of material removed from its center forming a chamber 18. The sheets are secured in position by dowels 20 which are fixed to the base.

FIG. 2 illustrates the pallet 22, which consists of a handle 23 and a thickness of material 24 whose bottom face 25 is larger than the area of the chamber. The pallet has an adhesive layer 26 on its bottom face which is smaller than the area of the chamber.

FIG. 3 illustrates the placement guide 28, consisting of a thickness of material which has dimensions which allow it to fit inside the chamber and which has an open center area with a dimension which is slightly smaller then the area of the adhesive layer on the pallet.

FIG. 4 illustrates the sorting tool, modified by the addition of a frame 30, with several of the sizing sheets folded back. Seed beads 32 are shown lying on the sorter base and adhering to the pallet.

FIG. 5 illustrates devices required to use the sorting tool to sort tubular beads. FIG. 5a illustrates the tubular bead holder 34, which consists of a sheet of rigid material which has dimensions which allow it to fit within the chamber and which is of a thickness which is determined by the length of the beads to be sorted. The holder has bores 36 which are of sufficient diameter to contain the tubular beads to be sorted. FIG. 5b is a placement device consisting of a tube 38 of sufficient inside diameter to contain the tubular beads, a funnel 40 and a lid 42.

FIG. 6 illustrates the tubular bead holder inserted in the chamber of the sorting tool.

FIG. 7 illustrates a holder for round beads 44, consisting of a thickness of rigid material with semicircular cavities 46 in its surface.

OPERATION

FIGS. 3, 4, 5, 6

FIG. 4—Place the beads in the chamber of the sorting tool and distribute them evenly in a space no larger than the size of the adhesive sheet on the bottom face of the pallet. Arrange the beads as closely together as possible in the center of the chamber, clear of the edges so that the adhesive on the selection pallet will not make contact with the sizing sheets when it is lowered onto them. To this end, insert the placement guide of FIG. 3 in the chamber of the sorting tool before placing the beads. To achieve even distribution of the beads, grasp the sides of the sorter base and, without lifting it, gently slide it back and forth. Arrange any beads that are not yet lying flat with a beading needle or remove and discard them if they are irregular. Remove the placement guide. Place the pallet over the sizing sheets so that the adhesive is directly over the beads and lower it gradually until contact is made between the adhesive and the beads or between the pallet and the sizing sheets. If no contact is made with the beads, fold back one of the sizing sheets and repeat until one or more beads is selected.

For convenience, or where only a numbering convention is required, the sizing sheets are numbered along their edge with the bottommost sheet numbered 1. The minimum size of the selected beads is determined by multiplying the number of sheets remaining on the stack by the thickness of each sheet. The maximum size is equal to the minimum size plus the thickness of a sheet. A different size range can be obtained by increasing or reducing the thickness of the sizing sheets.

Remove the selected beads from the pallet to an appropriately labeled container, and repeat. Depending on the thickness of the sizing sheets and the number of beads of any one size, the pallet may have to be lowered several times before each sheet is folded back. Sort round beads in the same manner by placing the round bead holder of FIG. 5 in the chamber.

To sort tubular beads place two or more tubular bead holders in the chamber, as in FIG. 6. The height of the stack of bead holders should be greater than the length of the beads so that the beads will not stand clear of the holders after insertion. This will make the beads easier to insert. Cover the end of the tube with a finger, place a quantity of beads in the funnel and cover the opening with the snap-on lid. Agitate the assembly until the tube is full of beads. Squeeze the tube near the bottom, pinching the bottommost bead to prevent it from leaving the tube, and place the opening of the tube over a bore in the bead holder and let a bead fall into the bore. Pinch the tube again, remove the tube to another bore, and repeat until the holder is full. Remove the topmost holder, exposing the ends of the beads, and size the tubular beads in the same manner as the seed beads.

SUMMARY, RAMIFICATIONS, AND SCOPE

The reader will see that the sorting tool of the invention provides a very accurate, versatile, yet simple and economical means for sorting groups of objects with diverse shapes and sizes.

While the above description contains many specificities, these should not be seen as limitations on the scope of the invention, but rather as a description of one preferred embodiment. Many other variations are possible. For example, it is possible to sort larger objects by either adding additional sizing sheets or by inserting an appropriate thickness of material under the stack, depending on the size range required. It is further possible to sort objects with shapes not specified here by using an appropriate holder for these objects. Accordingly, the scope of the invention should not be determined by the embodiments illustrated, but by the appended claims and their legal equivalents.

I claim:
1. A sorting tool for sorting objects based on size comprising:
   (a) a flat, rigid support means of sufficient size to allow placement of objects to be sorted thereon;
   (b) a plurality of sheets of material of predetermined size and thickness, said sheets being removably stacked on each other and having a portion of material removed from their centers thereby forming a chamber to contain the objects to be sorted, said stacked sheets being placed on said support means;
   (c) a hand held, manually manipulable means having an adhesive surface for engaging and removing selected ones of said objects; whereby the thickness of said stack of sheets defines the size of the objects engaged and removed by said adhesive surface with those objects of a size greater than the stack thickness being removed from the chamber by said adhesive surface and those objects of a size less than the stack thickness remaining in said chamber.

2. The sorting tool of claim 1, wherein said sheets are removable from the stack to change the size of objects removed by said adhesive surface.

3. The sorting tool of claim 1, further including object placement means sized to be placed in said chamber and having cavities in its surface of appropriate dimensions to contain said objects.

4. A process for sizing beads comprising the steps:
   (a) providing a flat, rigid support means of sufficient size to allow placement of beads to be sorted thereon;
   (b) providing a plurality of sheets of material of predetermined size and thickness, said sheets being removably stacked on each other and having a portion of material removed from their centers, thereby forming a chamber to contain the beads to be sorted, said stacked sheets being placed on said support means;
   (c) providing a manipulable means having an adhesive surface for engaging and removing selected ones of said beads;
   (d) selecting a thickness of said stack of sheets which is defined by the number of sheets in the stack;
   (e) placing beads to be sized in said chamber, said beads having flat ends and being in a shape selected from substantially oblate and substantially tubular;
   (f) orienting said beads in said chamber so that each bead rests on said support means on one of the bead's flat ends; and
   (g) engaging and removing at least a portion of said beads with said manipulable means having an adhesive surface.

5. The process of claim 4 wherein steps (d) through (g) are repeated in that sequence.

6. The process of claim 4 including, prior to step (e), placing in said chamber bead placement means having cavities in its surface of appropriate dimensions to contain said beads.

* * * * *